3,294,722
WAX COATING AND LAMINATING COMPOSITIONS
Dominic A. Apikos, Laurel Springs, N.J., Charles J. Kremer, Brookhaven, and Walter E. F. Lewis, Media, Pa., and Donald H. Russell, Pennsauken, N.J., assignors to The Atlantic Refining Company, Philadelphia, Pa., a corporation of Pennsylvania
No Drawing. Filed Dec. 31, 1963, Ser. No. 334,901
9 Claims. (Cl. 260—28.5)

This invention relates to wax coating and laminating compositions and, more particularly, it relates to petroleum paraffin wax compositions containing oily polymers of styrene.

Wax compositions containing various polymeric materials have long been utilized for coating paper-board for use in packaging frozen foods and for coating carton-board for use in the dairy industry. Similar compositions have also been used for laminating various materials to paper-board and cardboard.

One of the principal disadvantages of the wax compositions heretofore utilized for these purposes has been the high viscosity of the molten composition when it is used to coat or laminate the various types of paper substrates. The high viscosity resulted from the requirement that rather large quantities of polymeric additives were required to be incorporated in the wax in order to provide the desired properties to the wax, such as low water vapor transmission rates with good flexibility and high seal strength characteristics.

The compositions of the instant invention provide a number of advantages over wax coating compositions known and used heretofore. The instant compositions, while providing the same water vapor transmission rate with high flexibility and high seal strengths as compositions previously known and utilized have viscosities when melted, which are considerably lower than the viscosities of the prior art compositions when melted. This characteristic of the instant wax compositions permits the use of conventional and existing wax coating and laminating machines as will be described in detail.

The compositions of this invention also provide extremely good seals, for example, tear seals between carton-board and polypropylene and between aluminum (E wettable, oily foil) and cellophane.

In addition the compositions of the instant invention are extremely stable so that they degrade very slowly or not at all.

It is an object of this invention to provide wax coating and laminating compositions having desirable viscosity characteristics in the molten condition.

It is another object of this invention to provide a wax composition having superior coating and laminating performance characteristics in conjunction with low viscosities when in the molten state.

It is another object of this invention to provide a wax coating and laminating composition containing low molecular weight, oily polymers of styrene.

Other objects of this invention will be apparent from the description of the invention and the claims that follow.

In accordance with the instant invention there is added to a petroleum paraffin wax critical quantities of microcrystalline wax, of copolymers of ethylene and vinyl acetate and of low molecular weight oily polymers of styrene.

The paraffin wax which comprises the principal ingredient of the composition has a melting point (American Melting Point) in the range of about 121° F. to 155° F. and ranges in amount from 40 weight percent to 85 weight percent of the total composition. Such paraffin waxes are preferably of petroleum origin and may range from fully refined paraffin waxes, also designated as A.P.I. Type I waxes, through semi-refined waxes to semi-microcrystalline waxes, also designated as A.P.I. Type II waxes.

The preferred paraffin waxes are the fully refined petroleum paraffin waxes having a melting point of about 154° F. although these may range in melting point from 153° F. to 158° F. Another suitable paraffin wax is a semi-refined petroleum paraffin wax or scale wax having a melting point of 129° F. with a range of 128° F. to 130° F. Fully refined paraffin waxes having melting points as low as 121° F. also have been found to be useful in the instant compositions.

The microcrystalline wax used in the compositions has a melting point (A.S.T.M. D–127) in the range of from about 145° F. to 195° F. and ranges in amount from 5 weight percent to 20 weight percent of the total composition. A preferred microcrystalline wax has a melting point of about 175° F.

The copolymers of ethylene and vinyl acetate suitable for the purposes of this invention are those copolymers having a polymerized vinyl acetate content of from about 15 weight percent to 30 weight percent and a melt index in the range from 1 to 150. Polymers containing from 25 weight percent to 30 weight percent polymerized vinyl acetate have been found particularly suitable with those having a polymerized vinyl acetate content of about 28 weight percent being particularly preferred.

The amount of copolymer of ethylene and vinyl acetate ranges between 5 weight percent and 30 weight percent of the composition. These copolymers, which are available commercially, are prepared by copolymerizing a mixture of ethylene and vinyl acetate in the presence of a catalyst such as oxygen or an organic peroxide such as t-butyl hydroperoxide. The copolymerization is carried out at elevated pressures up to 30,000 p.s.i. and at elevated temperatures up to 250° C. The melt index of the copolymer is varied by varying the conditions of temperature, pressure, catalyst concentration and vinyl acetate content of the mixture being copolymerized. The unreacted monomer is flashed from the copolymer after the reaction in order to produce the finished copolymer.

The polymers of styrene suitable for use in the compositions of this invention are characterized by having a minimum initial boiling point of about 300° F. at 7 millimeters of mercury pressure, a minimum of 80 volume percent distillable overhead at 600° F. under 7 millimeters of mercury pressure and the fraction boiling above 600° F. being soluble in the paraffin waxes which are used in the composition. These polymers, in general, may range in number average molecular weight from about 300 for the lowest boiling polymers to about 1500 for the highest boiling fraction.

The polymers of styrene which are suitable for use in the compositions of this invention are further characterized by their "oily" or semi-solid physical state at room temperatures and their "tackiness." They may be produced by polymerizing styrene as the monomer to produce the polystyrene or by polymerizing alpha-methylstyrene as the sole monomer to produce poly-alpha-methylstyrene as the product. Instead of using only the pure monomers, mixtures of monomers may be used, e.g., mixtures of styrene and alpha-methylstyrene may be co-polymerized to produce the low molecular weight copolymers.

Alkylated styrenes where there are one or more alkyl substituents on the ring also may be polymerized to produce oily polymers which are also suitable for use in the compositions of this invention. A particularly suitable polymer of this type is produced by the simultaneous alkylation and polymerization of monomeric styrene. In this process the styrene monomer is admixed with an alpha-olefin containing from 4 to 17 carbon atoms and a simultaneous alkylation and polymerization is carried out in the presence of a Friedel-Crafts type catalyst, e.g., $AlCl_3$, in a diluent such as heptane. If the mole ratio of styrene monomer to alpha-olefin monomer is 1:1, a styrene polymer will be produced wherein, on the average, each ring has an alkyl group substituted thereon. If the mole ratio of alpha-olefin to styrene is 1:2, on the average, only alternate rings of the styrene chain of the polystyrene will be alkylated. The reaction temperature may range between 10° C. and 100° C., however, reaction temperatures of from 25° C. to 65° C. are preferred. A detailed description of the preparation of these alkylated polystyrene polymers is set forth in the co-pending application of Donald H. Russell and Benjamin C. Wilbur, filed of even data herewith and entitled "Method for the Production of Alkylated Styrene Polymers."

The polymers of styrene which are used in the compositions of this invention are characterized by the repeating monomeric unit

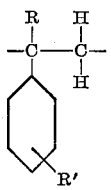

wherein R may be hydrogen or methyl and R' may be hydrogen, methyl, or an alkyl group having from 4 to 17 carbon atoms in the alkyl group and which may be straight or branched chain. In general, the polymers of styrene which are compatible with the paraffin wax contain from about 3 to about 15 such monomeric units although the number of such units may be somewhat higher or lower depending upon the molecular weight of the alkyl substituents, if these are present in the molecule.

In producing the compositions of this invention it is preferable first to melt the paraffin wax and the microcrystalline wax and then admix these ingredients. The polymer of styrene is added to the molten wax mixture and thereafter the copolymer of ethylene and vinyl acetate is added to complete the composition.

The following examples are provided to illustrate specific embodiments of this invention, however, it will be understood that the invention is not limited thereto.

*Example I*

The following composition was prepared, each ingredient being given in weight percent:

| | |
|---|---|
| Fully refined paraffin wax, M.P. 154° F. | 67.5 |
| Microcrystalline wax, M.P. 175° F. | 20.0 |
| Copolymer of ethylene and vinyl acetate | 5.0 |
| Styrene polymer | 7.5 |
| Oxidation inhibitor, p.p.m. | 30 |

The copolymer of ethylene and vinyl acetate had a polymerized vinyl acetate content of about 28 weight percent and a melt index of 2.9. The styrene polymer was a commercial resin sold under the trade name "Piccolastic A-30." It had a melting point, as measured by the ring and ball method, of 30° C., an initial boiling point of 310° F. at 7 mm. of mercury pressure, a molecular weight in the range between 325 to 350 and a specific gravity of about 1.03. The oxidation inhibitor was a commercial material sold under the trade name "Tenox BHA" (butylated hydroxyanisole) and the amount used was 30 parts per million by weight. It provided heat and color stability to the wax composition.

This composition was found to have a viscosity of 20 centistokes at 250° F. It provided an excellent external coating material for corrugated board and for coating carton board. The coating was particularly resistant to penetration by ice, water and grease such as chicken fat so that the coated carbon board could be used for shipping meat and poultry products packed in ice.

In general, coating compositions in this viscosity range, i.e., from 10 to 50 centistokes at 250° F., may contain from 10 weight percent to 20 weight percent microcrystalline wax having a melting point of about 175° F.; from 5 weight percent to 7 weight percent of the above described copolymer of ethylene and vinyl acetate and from 5 weight percent to 10 weight percent of the styrene polymer with the remainder of the composition consisting of the fully refined paraffin wax having a melting point of 154° F. Preferably the compositions should also contain an oxidation inhibitor to provide the heat and color stability to the composition. The amount of the oxidation inhibitor used will be dependent upon the particular compound employed, in general, amounts from 5 p.p.m. to 50 p.p.m. are sufficient.

*Example II*

Another composition was prepared having the following ingredients in weight percent:

| | |
|---|---|
| Fully refined paraffin wax, M.P. 154° F. | 71.0 |
| Microcrystalline wax, M.P. 175° F. | 5.0 |
| Copolymer of ethylene and vinyl acetate | 11.0 |
| Styrene polymer | 13.0 |
| Oxidation inhibitor, p.p.m. | 30 |

Each of the ingredients was the same as in Example I. The viscosity of the composition was 123 centistokes at 250° F. It was found that this composition could be used in conventional carton coating equipment, it gave a glossy coating with stable gloss and excellent heat sealability. For example, this composition gave tear seals with carton board to carton board seals and exceptionally strong seals between carton board and aluminum foil.

Compositions having viscosities in the range of this example, i.e., from 50 to 250 centistokes at 250° F., contain from 5 to 20 weight percent of the microcrystalline wax having a melting point of 175° F., from 10 weight percent to 14 weight percent of the above-described copolymer of ethylene and vinyl acetate and from 9 weight percent to 25 weight percent of the polymer of styrene with the remainder of the composition being the paraffin wax. These compositions also preferably contain an oxidation inhibitor.

*Example III*

A composition was prepared having the following ingredients in weight percent:

| | |
|---|---|
| Fully refined paraffin wax, M.P. 154° F. | 52.0 |
| Microcrystalline wax, M.P. 175° F. | 10.0 |
| Copolymer of ethylene and vinyl acetate | 13.0 |
| Styrene polymer | 25.0 |
| Oxidation inhibitor, p.p.m. | 30 |

The ingredients of this composition were the same as in Examples I and II. The viscosity of the composition was 250 centistokes at 250° F. It was found to give coating compositions similar to those of Examples I and II with further improved barrier properties, gloss and gloss stability and laminating power.

*Example IV*

A composition was prepared having the following ingredients in weight percent:

| | |
|---|---|
| Fully refined paraffin wax, M.P. 154° F. | 53.0 |
| Microcrystalline wax, M.P. 175° F. | 7.5 |
| Copolymer of ethylene and vinyl acetate | 25.0 |
| Styrene polymer | 14.5 |
| Oxidation inhibitor, p.p.m. | 30 |

The ingredients of this composition were the same as in Examples I, II and III. The composition, which had a viscosity of about 2,000 centipoises at 250° F., was found to be an excellent coating for milk cartons, being heat sealable, highly flexible, gloss stable and resistant to penetration by milk. This coating was comparable to extrusion coated polyethylene milk cartons.

*Example V*

A milk carton coating similar to Example IV was prepared having the following ingredients in weight percent:

| | |
|---|---|
| Fully refined paraffin wax, M.P. 154° F. | 53.0 |
| Microcrystalline wax, M.P. 175° F. | 15.0 |
| Copolymer of ethylene and vinyl acetate | 25.0 |
| Styrene polymer | 7.0 |
| Oxidation inhibitor, p.p.m. | 30 |

This composition had essentially the same excellent coating characteristics as those of the composition of Example IV. It also had a viscosity of 2,000 centipoises at 250° F.

*Example VI*

A composition prepared having the following ingredients in weight percent:

| | |
|---|---|
| Fully refined paraffin wax, M.P. 154° F. | 44.8 |
| Microcrystalline wax, M.P. 175° F. | 20.0 |
| Copolymer of ethylene and vinyl acetate | 27.2 |
| Alpha-methylstyrene polymer | 8.0 |
| Oxidation inhibitor, p.p.m. | 30 |

All of the ingredients except the alpha-methyl-styrene polymer were the same as in the previous examples. The alpha-methylstyrene polymer was a white, oily, odorless material having a molecular weight of approximately 375.

The composition had a viscosity of 2,100 centipoises at 250° F. and when used to coat milk cartons it gave excellent flex adhesion, seals, gloss, smoothness and bulge resistance.

The preferred milk carton coating compositions of this invention contain from 7.5 weight percent to 20 weight percent microcrystalline wax of 175° F. melting point, from 22 weight percent to 30 weight percent of copolymer of ethylene and vinyl acetate described above, and from 7.0 weight percent to 20 weight percent of the polymer of styrene with the remainder of the composition being the fully refined paraffin wax of 154° F. melting point. These compositions also contain an oxidation inhibitor. It has been found that at least 22 weight percent of the ethylene vinyl acetate copolymer is required to provide the necessary seal strength to the milk carton coating composition. These compositions range in viscosity from 1800 centipoises to 500 centipoises at 250° F.

It has been found by comparing the compositions of the foregoing examples and by numerous other tests that the ethylene vinyl acetate copolymer content of the composition controls the viscosity of the composition, since at 250° F. and higher, i.e. at normal wax coating temperatures, the polymers of styrene used in these compositions have such a low viscosity that in these compositions these styrene polymers behave like the wax components. Therefore, it is possible to control the viscosity of the final composition by controlling the amount of the ethylene vinyl acetate copolymer in the composition.

*Example VII*

An alkylated styrene polymer was prepared from an alpha-olefin fraction which in turn was prepared by cracking a paraffin wax. This alpha-olefin fraction contained from 8 to 10 carbon atoms in the molecule. A solution consisting of styrene and the $C_8$-$C_{10}$ alpha-olefin fraction in a mole ratio of 2:1 styrene to olefin was prepared in n-heptane. This solution was added slowly over a period of approximately 4½ hours with constant stirring to a slurry of aluminum chloride catalyst in n-heptane (0.015 mole of catalyst per liter based on total volume of n-heptane and reactant). The reaction temperature was 80° F. Upon completion of the addition of the reactants, the mixing was continued for an additional ½ hour giving a total reaction time of 5 hours. The reaction was terminated by the addition of an aqueous methanol solution containing approximately 5 volume percent concentrated hydrochloric acid. The polymer was washed three times with water to remove the catalyst therefrom. The finished polymer had an A.S.T.M. distillation at 7 mm. mercury pressure of 3 percent overhead at 300° F. and an end point of 569° F., a viscosity at 250° F. of 69.1 centistokes, and a molecular weight in the range of 400–700. Analysis showed the benzene rings of the styrene polymer chain were alkylated predominantly in the para position although some ortho alkylation was observed also. This polymer was utilized to make up a composition identical with that of Example V, except that where a styrene polymer was utilized in Example V the alkylated styrene polymer prepared as described above was utilized. Coatings prepared with this composition compared favorably with the coatings prepared with the composition of Example V showing better sealability, lower viscosity, better gloss properties than the coatings of Example V, but slightly less flexibility than the coatings of Example V.

*Example VIII*

An alpha-olefin fraction having from 6 to 8 carbon atoms in the molecule was prepared by cracking a petroleum paraffin wax. A solution of styrene and this alpha-olefin fraction in a mole ratio of styrene to olefin of 2.5:1 in n-heptane was prepared. This solution was added over a period of 2 hours to a slurry of aluminum chloride in n-heptane (0.015 mole of catalyst per liter of total solution, heptane and reactants) at a reaction temperature of 150° F. The reaction was continued for an additional 15 minutes and thereafter the reaction was terminated by the addition of aqueous methanol hydrochloric acid solution similar to that used in Example VII. The polymer was washed free of catalyst with water and when finished had a viscosity of 34.8 centistokes at 250° F. and a molecular weight in the 400–700 range. This polymer and the polymer prepared in Example VII were each substituted for the styrene polymer in the composition set forth in Example I. Coatings prepared from these compositions were very similar to the coatings of Example I there being no marked difference between them and the coatings of Example I.

These experiments demonstrate that the alkylated styrene polymers are equivalent to the polystyrene and the poly-alpha-methylstyrene in the compositions of this invention.

*Example IX*

In order to demonstrate the advantage of the polymers of styrene as compared with various petroleum oils, three compositions were prepared utilizing the same paraffin wax and ethylene-vinyl acetate copolymer as in Example I. The styrene polymer also was the same as that employed in Example I. The compositions shown in the table are in weight percent.

| | Composition | | |
|---|---|---|---|
| | A | B | C |
| Fully refined paraffin wax, M.P. 154° F. | 55 | 55 | 55 |
| Copolymer of ethylene and vinyl acetate | 30 | 30 | 30 |
| Paraffinic petroleum oil | 15 | | |
| Aromatic petroleum oil | | 15 | |
| Styrene polymer | | | 15 |

The paraffinic oil was a heavy white oil having a viscosity of 500 Saybolt seconds Universal at 210° and the aromatic oil consisted predominantly of trialkylated benzenes wherein the alkyl groups contained 5 to 6 carbon atoms.

It was found that composition C containing the styrene polymer produced coatings which had excellent flexibility, gave tear seals with carton paper, were heat sealable, did not bleed. Composition A gave coatings which had almost no flexibility, poor seal strength, and gave excessive bleeding. Composition B gave coatings of poor flexibility, low seal strength and gave moderate bleeding. These experiments demonstrate the unique plasticizing properties of the styrene polymers in the instant compositions.

*Example X*

A number of compositions were prepared utilizing conventional wax additive polymers for comparison with the styrene polymer. The paraffin wax, the copolymer of ethylene and vinyl acetate and the styrene polymer were the same as that employed in Example I. The amounts of the ingredients are given in weight percent.

|  | Composition | | | |
| --- | --- | --- | --- | --- |
|  | D | E | F | G |
| Fully refined paraffin wax, M.P. 154° F. | 70 | 70 | 70 | 70 |
| Copolymer of ethylene and vinyl acetate | 25 | 25 | 25 | 25 |
| Styrene polymer | 5 | | | |
| Polyethylene (21,000 m.w.) | | 5 | | |
| Polyisobutylene (80,000 m.w.) | | | 5 | |
| Ethylene propylene copolymer (60,000 m.w.) | | | | 5 |
| Viscosity of composition in centipoises at 250° F. | 2,000 | 4,900 | 5,100 | 5,700 |

These experiments show that the styrene polymers of this invention produce compositions of much lower viscosities than are obtainable with conventional polymer additives for wax.

We claim:

1. A wax coating and laminating composition consisting essentially of from 5 to 30 weight percent of a polymer of styrene having an initial boiling point of at least 300° F. at 7 millimeters of mercury pressure and a molecular weight in the range of from about 300 to 1500, from 5 to 30 weight percent of a copolymer of ethylene and vinyl acetate having a polymerized vinyl acetate content in the range of from 15 weight percent to 30 weight percent of the copolymer and a melt index ranging between 1 and 150, from 5 to 20 weight percent of a microcrystalline wax having a melting point in the range of from about 145° F. to 195° F. and from 40 to 85 weight percent of a paraffin wax having a melting point of from about 121° F. to 155° F.

2. A wax coating and laminating composition consisting essentially of from 5 weight percent to 30 weight percent polystyrene having an initial boiling point of at least 300° F. at 7 millimeters of mercury pressure and a molecular weight in the range of from about 300 to 1500, from 5 weight percent to 30 weight percent of a copolymer of ethylene and vinyl acetate having a polymerized vinyl acetate content in the range of from 15 weight percent to 30 weight percent of the copolymer and a melt index ranging between 1 and 150, from 5 weight percent to 20 weight percent of a microcrystalline wax having a melting point in the range of from about 145° F. to 195° F. and from 40 weight percent to 85 weight percent of a paraffin wax having a melting point of from about 121° F. to 155° F.

3. A wax coating and laminating composition consisting essentially of from 5 weight percent to 30 weight percent of a polymer of alpha-methylstyrene having an initial boiling point of at least 300° F. at 7 millimeters of mercury pressure and a molecular weight in the range of about 300 to 1500, from 5 weight percent to 30 weight percent of a copolymer of ethylene and vinyl acetate having a polymerized vinyl acetate content in the range of from 15 weight percent to 30 weight percent of the copolymer and a melt index ranging between 1 and 150, from 5 weight percent to 20 weight percent of a microcrystalline wax having a melting point in the range of from about 145° F. to 195° F. and from 40 weight percent to 85 weight percent of a paraffin wax having a melting point of from about 121° F. to 155° F.

4. A wax coating and laminating composition consisting essentially of from 5 weight percent to 30 weight percent of a polymer of styrene wherein the benzene rings of the styrene chain are alkylated with alkyl groups containing from 4 to 17 carbon atoms and the polymer is further characterized by having a molecular weight in the range of from about 300 to 1500, from 5 weight percent to 30 weight percent of a copolymer of ethylene and vinyl acetate having a polymerized vinyl acetate content in the range of from 15 weight percent to 30 weight percent of the copolymer and a melt index ranging between 1 and 150, from 5 weight percent to 20 weight percent of a microcrystalline wax having a melting point in the range of from about 145° F. to 195° F. and from 40 weight percent to 85 weight percent of a paraffin wax having a melting point of from about 121° F. to 155° F.

5. A wax coating and laminating composition consisting essentially of from 5 weight percent to 10 weight percent of a polymer of styrene having an initial boiling point of at least 300° F. at 7 millimeters of mercury pressure and a molecular weight in the range of from about 300 to 1500, from 5 weight percent to 7 weight percent of a copolymer of ethylene and vinyl acetate having a polymerized vinyl acetate content of about 28 weight percent and a melt index of about 2.9, from 10 weight percent to 20 weight percent microcrystalline wax having a melting point of about 175° F. and the remainder of the composition a fully refined paraffin wax having a melting point of about 154° F., said composition being further characterized by having a viscosity in the range of from 10 centistokes to 50 centistokes at 250° F.

6. A wax coating and laminating composition consisting essentially of from 9 weight percent to 25 weight percent of a polymer of styrene having an initial boiling point of at least 300° F. at 7 millimeters of mercury pressure and a molecular weight in the range of from about 300 to 1500, from 10 weight percent to 14 weight percent of a copolymer of ethylene and vinyl acetate having a polymerized vinyl acetate content of about 28 weight percent and a melt index of about 2.9, from 5 weight percent to 20 weight percent microcrystalline wax having a melting point of about 175° F. and the remainder of the composition a fully refined paraffin wax having a melting point of about 154° F., said composition being further characterized by having a viscosity in the range of from 50 centistokes to 250 centistokes at 250° F.

7. A wax coating and laminating composition consisting essentially of from 7.0 weight percent to 20 weight percent of a polymer of styrene having an initial boiling point of at least 300° F. at 7 millimeter of mercury pressure and a molecular weight in the range of from about 300 to 1500, from 22 weight percent to 30 weight percent of a copolymer of ethylene and vinyl acetate having a polymerized vinyl acetate content of about 28 weight percent and a melt index of about 2.9, from 7.5 weight percent to 20 weight percent microcrystalline wax having a melting point of about 175° F., and the remainder of the composition a fully refined paraffin wax having a melting point of about 154° F., said composition being further characterized by having a viscosity in the range of from 1800 centipoises to 5000 centipoises at 250° F.

8. A wax coating and laminating composition consisting essentially of from 7.0 weight percent to 20 weight percent of a polymer of alpha-methylstyrene having an initial boiling point of at least 300° F. at 7 millimeters of mercury pressure and a molecular weight in the range of from about 300 to 1500, from 22 weight percent to 30 weight percent of a copolymer of ethylene and vinyl acetate having a polymerized vinyl acetate content of about 28 weight percent and a melt index of about 2.9, from 7.5 weight percent to 20 weight percent microcrystalline wax having a melting point of about 175° F., and the remainder of the composition a fully refined paraffin wax having a melting point of about 154° F., said composition being further characterized by having a viscosity in the range of from 1800 centipoises to 5000 centipoises at 250° F.

9. A wax coating and laminating composition consisting of essentially from 7.0 weight percent to 20 weight percent of a polymer of styrene wherein the benzene rings of the styrene chain are alkylated with alkyl groups having from 6 to 10 carbon atoms and the polymer is further characterized by having a molecular weight in the range of from about 400 to 700 from 22 weight percent to 30 weight percent of a copolymer of ethylene and vinyl acetate having a polymerized vinyl acetate content of about 28 weight percent and a melt index of about 2.9, from 7.5 weight percent to 20 weight percent microcrystalline wax having a melting point of about 175° F., and the remainder of the composition a fully refined paraffin wax having a melting point of about 154° F., said composition being further characterized by having a viscosity in the range of from 1800 centipoises to 5000 centipoises at 250° F.

References Cited by the Examiner
UNITED STATES PATENTS

| | | | |
|---|---|---|---|
| 2,580,996 | 1/1952 | Butler | 260—28.5 |
| 3,025,167 | 3/1962 | Butler | 260—28.5 |
| 3,178,383 | 4/1965 | Butler | 260—28.5 |

MORRIS LIEBMAN, *Primary Examiner.*

J. FROME, *Assistant Examiner.*